Aug. 26, 1947.  D. D. GRIEG  2,426,203
RADIO BEAM CONTROLLED INDICATING INSTRUMENT
Filed April 20, 1944  3 Sheets-Sheet 1

INVENTOR.
DONALD D. GRIEG
BY
*Percy P. Lantry*
ATTORNEY

INVENTOR.
DONALD D. GRIEG
BY
ATTORNEY

Aug. 26, 1947.                D. D. GRIEG                2,426,203
             RADIO BEAM CONTROLLED INDICATING INSTRUMENT
                 Filed April 20, 1944    3 Sheets-Sheet 3
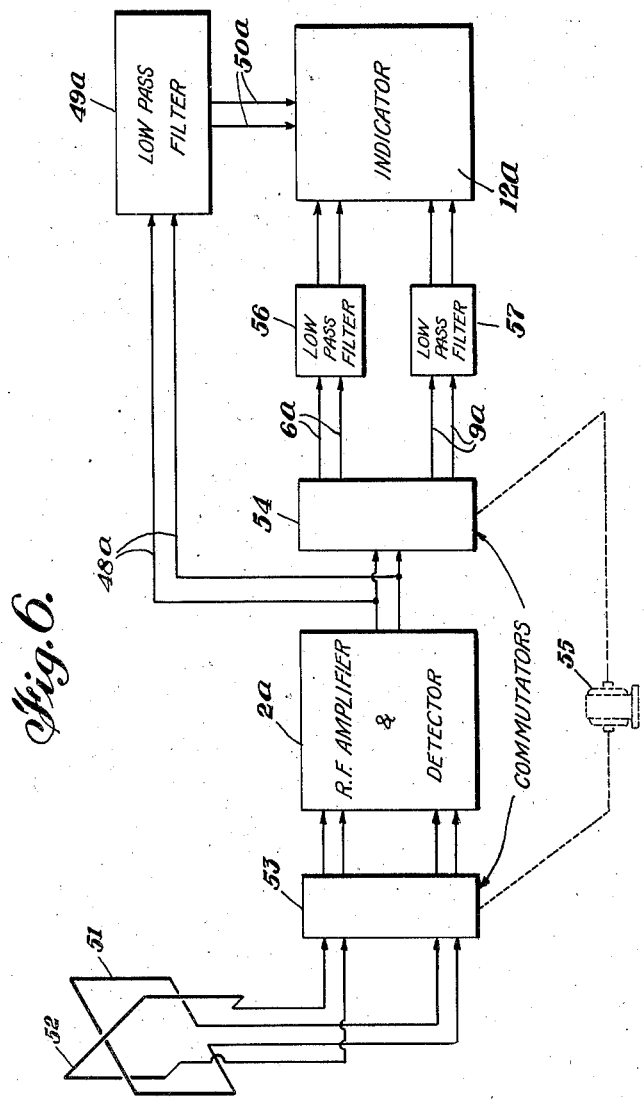
INVENTOR.
DONALD D. GRIEG
BY
ATTORNEY Patented Aug. 26, 1947

2,426,203

UNITED STATES PATENT OFFICE 2,426,203

RADIO BEAM CONTROLLED INDICATING INSTRUMENT

Donald D. Grieg, Forest Hills, N. Y., assignor to Federal Telephone and Radio Corporation, New York, N. Y., a corporation of Delaware Application April 20, 1944, Serial No. 531,882

14 Claims. (Cl. 171—95)

The present invention relates to indicating devices, and more particularly to devices of the type which provide a visual indication of the relative strength of a plurality of electrical currents.

There are numerous occasions when it is desirable to know the relation between the magnitude of several electrical currents. One example would comprise the utilization of two interrupted overlapping beams of energy transmitted by a ground station as an aid in guiding aircraft along a particular route. When the craft is following a predetermined course along the intersection of the beams, substantially equal energy is derived from each of the beams. However, when the craft deviates from the intersection of the beams, the relative strength of the currents received will vary, and the pilot will be apprised of such a condition by the action of a visible or audible warning device.

Instruments for visually indicating the relative strength of two such received signals are necessarily delicate and require care in adjustment. For 360° rotation of the meter pointer by necessity no balancing springs can be used. Due to the severe vibration and other shocks encountered in aircraft, the needle or pointer of these indicating instruments is often caused to assume a position which is at variance with the true reading during the period of interruption in the reception of the control signals. This holds true even though cushioning or other resilient mountings are employed.

Displacement of the instrument pointer due to vibration or shock is almost immediately compensated for while the signal energy is being continuously received. However, prior to the present invention there has been no completely satisfactory way of maintaining the pointer in its last indicating position after the reception of signal energy has ceased. This is particularly desirable when the information transmitted is received in an intermittent fashion. Under these conditions the pilot must assume that the position of the pointer is a correct indication of the relative strength of the signals, and if the pointer has been jarred or shaken, during periods of no signal reception, serious errors may result. Some means should therefore be provided to carry over the signal information from one interval to the next.

According to my invention, means are provided whereby the pointer of an indicating device is automaticaly held in the latest indicating position during times when the signals it is desired to compare are not being received. However, upon reception of these signals, the automatic holding means is released, and the pointer becomes free to move as before in response to the relative strength of the currents in the transmitted energy.

One object of my invention, therefore, is to provide means for preventing the movement of an electrical indicator in response to external shocks applied after reception of energy by the indicator has ceased.

Another object of my invention is to establish in an indicator a relatively constant magnetic field during times when no signal currents are being received by the indicator, this magnetic field serving to prevent undesired movement of the indicator. Subsequent reception of a signal current then serves to neutralize the magnetic field and permit free movement of the indicator in response to the signal current.

A further object of my invention is to provide a device of the class described which is of simple form and construction, and may be easily and economicaly manufactured and assembled.

Other objects and advantages of my invention will become apparent and the foregoing will be best understood from the following description of an embodiment thereof, reference being had to the drawings in which:

Fig. 6 is a diagrammatic view of a modification of that form of the invention shown in Fig. 1.

Figure 1:
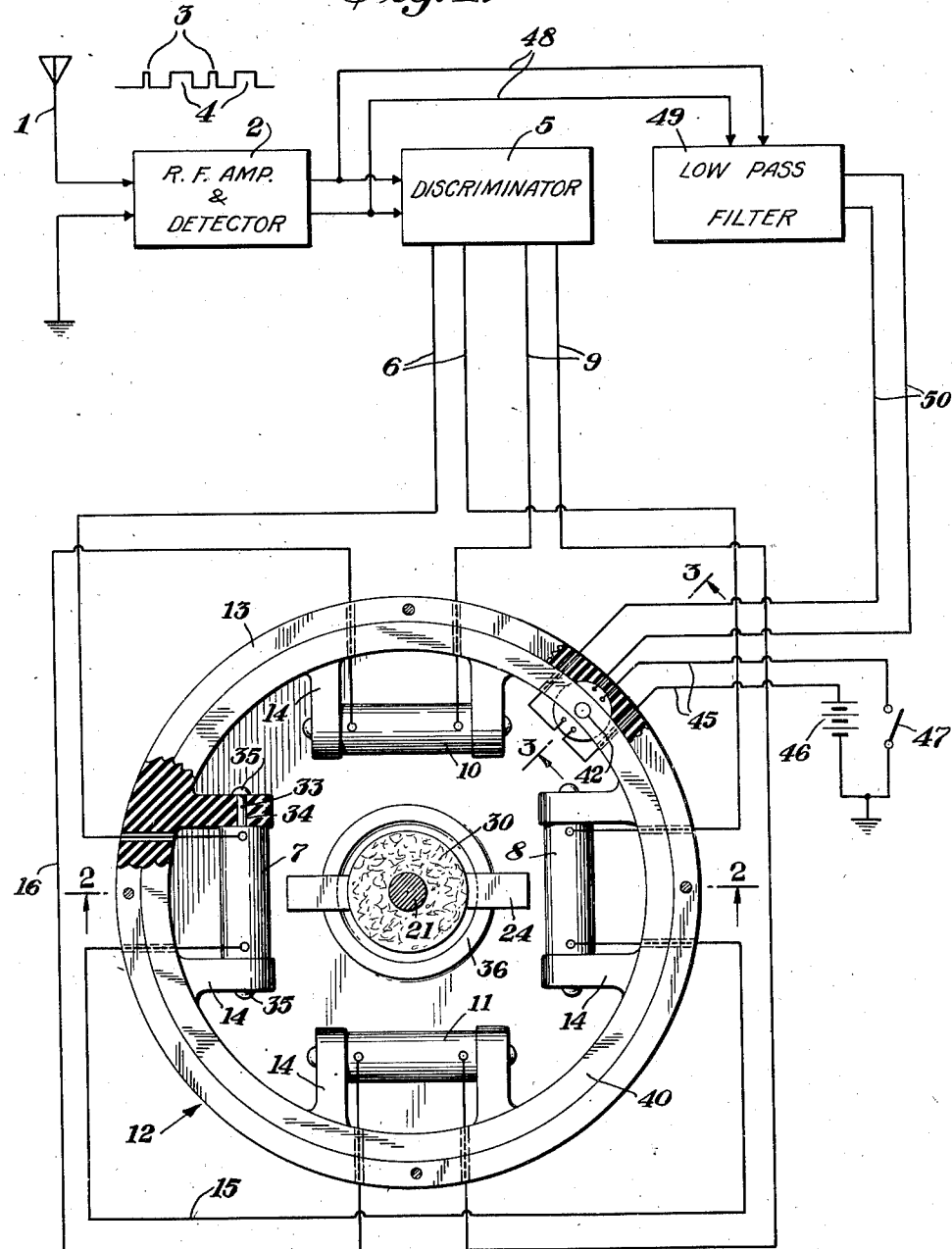
Fig. 1 is a plan view, partly in section of a preferred form of my invention, also showing symbolically and in block diagram certain electrical apparatus associated therewith.

In Fig. 1 is shown an antenna 1 connected to a radio-frequency amplifier and detector 2. The output of this radio-frequency amplifier and detector 2, which may constitute two trains of pulses such as indicated by the waveforms 3 and 4, is applied to a discriminator 5. This discriminator 5 may be of any known type, and serves to segregate the two pulse trains 3 and 4. One of these trains of pulses, say for example, pulse train 3, is applied over a pair of leads 6 to the upper terminals of two coils 7 and 8. The remaining train of pulses, train 4, is applied from discriminator 5 over another pair of leads 9 to the right hand terminals of two further coils 10 and 11.

Figure 2:
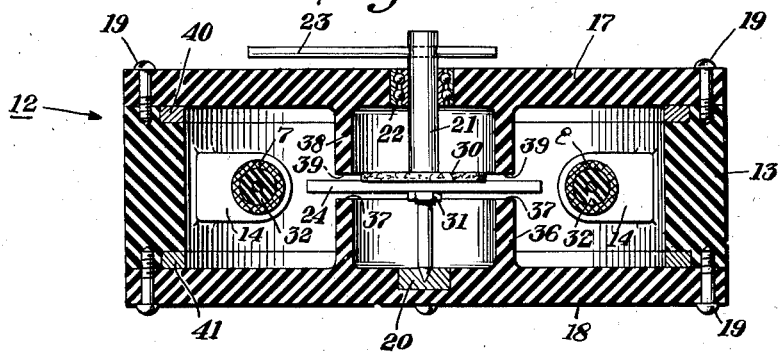
Fig. 2 is a sectional view along the line 2—2 of Fig. 1, also showing the pointer and the top cover for the apparatus shown in Fig. 1.

For supporting and enclosing the coils 7 and 8 at right angles to the coils 10 and 11, there is provided a hollow cylindrical housing generally indicated at 12 and best shown in Fig. 2. The housing 12 consists of a hollow cylindrical upright member 13 to which is fastened a plurality of brackets 14. These brackets 14 are arranged in pairs, oppositely disposed to one another in equally spaced-apart relation, and each pair of brackets supports one of the coils 7, 8, 10 and 11 as best shown in Fig. 1. The lower terminals of coils 7 and 8 are joined together by a connection 15 and similarly the left-hand terminals of coils 10 and 11 are joined together by a connection 16.

The upright member 13 is provided with a top cover portion 17 and a bottom cover portion or base plate 18. These cover portions 17 and 18 are designed to form with the upright side member 13 a closed housing for the coil portions 7, 8, 10 and 11. A plurality of screws 19 serve to secure the top and bottom cover portion 17 and 18 respectively to the upright side portion 13.

Moulded or otherwise recessed in the center of the bottom cover or base plate 18 is a bearing 20 supporting a rotatable shaft 21. This shaft 21 is supported near its upper extremity by a ball-bearing assembly 22 centrally positioned in top cover portion 17. A pointer 23 is secured to shaft 21 and rotates therewith.

On shaft 21 between cover plates 17 and 18 is a permanent bar magnet 24, so mounted that the extremities thereof have a limited amount of "rocking" action or vertical movement in either direction toward or away from the top and bottom cover plates 17 and 18.

Figure 5:
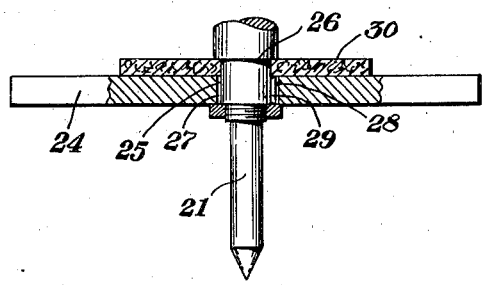
Fig. 5 is an enlarged view, in section, of the pivoting means for the magnet shown in Figs. 1 and 2.

Fig. 5 illustrates the means for mounting magnet 24 on shaft 21. Shaft 21 is provided with a portion 25 having a reduced diameter, so that a shoulder 26 is formed at the upper end of this reduced portion. An opening 27 in magnet 24 has its diameter slightly larger than the diameter of the reduced portion 25 of shaft 21, and this opening 27 is provided with an axial slot 28. A key 29 secured in shaft 21 is received by slot 28.

A washer 30 of rubber or other resilient material is positioned between shoulder 26 and the upper surface of magnet 24. A nut 31 engaging a threaded portion of shaft 21 tends to hold the magnet 24 against the washer 30.

Due to the difference in the diameters of the reduced portion 25 of shaft 21 and the opening 27, magnet 24 has a limited amount of rocking movement about nut 31, which rocking movement will tend to compress washer 30. However, due to the presence of key 29 in slot 28, no relative rotary movement of any consequence between the magnet and shaft can occur.

Coils 7, 8, 10 and 11 are wound upon insulating forms 32 (Fig. 2). A plurality of rods 33 passing through openings 34 in brackets 14, support coils 7, 8, 10 and 11 in position and are themselves held in place by a plurality of screws 35. The lower cover or base plate 18 is provided, as shown in Fig. 2, with an upwardly-projecting hollow cylindrical portion 36 having a flat upper surface 37. Similarly top cover plate 17 is provided with an integral downwardly-projecting hollow cylindrical portion 38 having a flat lower surface 39. Cylindrical portions 36 and 38 are preferably composed of some suitable insulating material having a relatively high coefficient of friction. Surfaces 37 and 39 of cylindrical portions 36 and 38 respectively lie adjacent the ends of bar magnet 24 as best shown in Fig. 2. These surfaces 37 and 39 are so positioned relative to magnet 24 that only a slight rocking movement of magnet 24 on nut 31, as above described, will be permitted.

A pair of ring-shaped members 40 and 41 composed of some suitable magnetizable material having preferably a low residual magnetism lie within recesses near the upper and lower peripheries of upright member 13 as best shown in Fig. 2. Between ring-shaped members 40 and 41 is a core 42 composed of magnetic material. (See Figs. 1 and 3.) On this core 42 is wound a pair of coils 43 and 44. Leads 45 connect coil 44 in series with a battery 46 and a switch 47.

Figure 4:
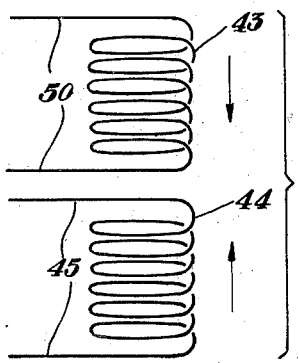
Fig. 4 is a schematic illustration showing the method of winding the coils of Fig. 3.

A portion of the output of radio-frequency amplifier and detector 2 is applied over leads 48 to a low-pass filter 49, in effect, separates the D. C. component from the detected pulse trains 3 and 4, and this direct current component is then applied over leads 50 to coil 43. Coils 43 and 44 are wound in opposite directions as indicated in Fig. 4, so that currents flowing in the two coils from leads 45 and 50 will tend to neutralize one another.

When two trains of pulses, such for example as those indicated by the waveforms 3 and 4, from the output of the amplifier and detector 2 are applied to the discriminator 5, these pulses will be separated as previously described and respectively conducted over the two pairs of leads 6 and 9 to the coils 7, 8 and 10, 11 respectively. Energy thus applied to the coils 7 and 8 will produce an electromagnetic field surrounding the coils. In a similar manner, energy supplied over the leads 9 will set up an electromagnetic field around the coils 10 and 11. These two fields will lie at right angles to one another, and will present a resultant maximum field, the direction of which will be determined by the relative strength of the two individual fields. The strength of either field will vary with respect to the other as a result of any variation in relative energy present in the respective pulse trains 3 and 4, and the resultant field vector will change its position in proportion to this variation.

Since the bar magnet 24 follows the resultant field vector, it will be seen that the position of the magnet 24 will be determined by the ratio between the amounts of energy contained in the pulse trains 3 and 4. Since a movement of the magnet 24 causes a corresponding movement of the pointer 23, it will be seen that the latter will therefore indicate the ratio of the magnitudes of the energy in the two pulse trains.

Figure 3:
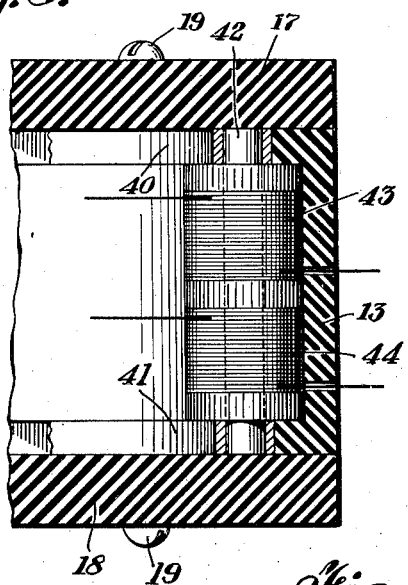
Fig. 3 is a sectional view along the line 3—3 of Fig. 1.

As above stated, the ring-shaped members 40 and 41 are connected by the core 42 as best shown in Fig. 3. If no signals are present in the output of amplifier and detector 2, no current will flow in leads 50. Under these conditions, and when switch 47 is closed, current from battery 46 will flow through leads 45 and energize coil 44. This current flow through coil 44 will be in a direction indicated by the arrow in Fig. 4, and will act to produce opposite magnetic poles in the magnetic members 40 and 41 in the absence of compensating current flow in coil 43.

When ring-shaped members 40 and 41 are thus magnetized by a flow of current in coil 44, magnet 24 will be attracted by this magnetization. Assuming that members 40 and 41 are respectively polarized north and south, and assuming that the magnet 24 in its position as shown in Fig. 2 has its left-hand end of north polarity and its right-hand end of south polarity, then the magnet 24 will be deflected or rocked about the nut 27 in a counter-clockwise direction, that is, the left-hand end of magnet 24 will be attracted downwardly toward the ring-shaped member 41, while the right-hand end of magnet 24 will be attracted upwardly toward the ring-shaped member 40.

As a consequence of this rocking action, the left end of magnet 24 will contact the flat surface 37 of the upwardly-projecting cylindrical portion 36 of base plate 18, and the right end of magnet 24 will similarly contact the downwardly projecting portion 38 of member 17. The frictional engagement between the surfaces 37 and 39 and the magnet 24 will continue as long as the magnet 24 is attracted by the magnetization of the ring-shaped members 40 and 41 due to the flow of current in winding 44, and will preclude the movement of pointer 23 due to vibration or other shocks applied to the housing 12 from external sources.

The above mode of operation has assumed that no current flows in leads 50 or, in other words, that no signals are being received by amplifier and detector 2.

Assume now that signals such as pulse trains 3 and 4 are passed by amplifier and detector 2, and thence conducted by leads 48 to the low-pass filter 49 which separates the D. C. component therefrom. This D. C. component applied over leads 50 will energize the coil 43. This flow of current in coil 43 will oppose the flow of current in coil 44, as indicated by the arrows in Fig. 4. By a proper selection of circuit elements, these two currents can be made to be of substantially equal magnitude and thus, in effect, will neutralize or cancel one another, thereby demagnetizing the ring-shaped members 40 and 41.

Upon demagnetization of the ring-shaped members 40 and 41, magnet 24 will return due to the action of resilient washer 30 from its "rocked" position to its substantially horizontal position as shown in Fig. 2 thereby releasing the magnet from its frictional engagement with surfaces 37 and 39 of the cylindrical members 36 and 38 respectively. The magnet 24 now being free to rotate will be subject to the fields of force set up by windings 7, 8, 10 and 11, and the pointer 23 will indicate the resultant strength of the currents in leads 6 and 9 as previously described.

The above condition will continue as long as a current flows in leads 50. Upon cessation of current flow in leads 50 and consequently in coil 43, only coil 44 will remain energized, and the pointer will be again locked in its new position.

In Fig. 6 is shown a modification of the system shown in Fig. 1 applied to a direction finder. This apparatus comprises a pair of directional antennas 51, 52 the outputs of which are fed to a commutating device 53, and thence to an R. F. detector and amplifier 2a which may be similar to the R. F. detector and amplifier 2 of Fig. 1.

The output of detector and amplifier 2a is then applied to a second commutating device 54, the two commutating devices 53 and 54 being synchronously driven as by a common source of power 55. The use of a commutating device such as 53 with directional antennae to connect the latter alternately and in reverse phase in the circuit through the amplifier and detector 2a is well known in the art, and will not be described in detail. A commutating device such as 54 serves to establish an intermittent flow of current successively over leads 6a and 9a from which the average component is extracted by means of low-pass filters 56 and 57. This D. C. component is fed through coils of indicator 12a corresponding to coils 7, 8, 10 and 11 of Figs. 1–3 in a manner which is also well known in the art.

This varying flow of current through the coils is effective to establish a field of force around such coils, the resultant effect of which is that of a unidirectional field of force which bears a predetermined directional relation to the incoming wave.

A portion of the output of detector and amplifier 2a is applied over leads 48a to a low-pass filter 49a and thence to indicator 12a. Elements 49a and 12a, and their circuit connections 48a and 50a, may be identical to the corresponding elements of Fig. 1.

Thus in accordance with the present invention means are provided whereby a device having a pointer or other indicator is held in position in the face of vibration or other shocks at times both preceding and subsequent to the actual reception of signals the magnitude of which it is desired to compare. Means are also provided whereby upon the actual reception of such signals, the holding means is automatically neutralized or overcome.

While I have described above the principles of my invention in connection with specific apparatus, it is to be clearly understood that this description is made only by way of example and not as a limitation on the scope of my invention as set forth in the objects of my invention and the accompanying claims.

I claim:

1. In an indicating instrument of the type wherein two separate applied energy waves are used to produce a resultant directive magnetic field, and a movable indicator means is moved to a position indicating the position of said directive magnetic field, the combination of control means for holding said indicator means in fixed position comprising means normally holding said indicator in relatively fixed position in the absence of said applied energy, and electrically controlled means responsive to energy received from said applied energy waves to release said holding means, whereby said indicator is free to move in response to said applied energy waves.

2. An indicating system according to claim 1 in which said holding means includes a magnetizable member, a coil operatively associated with said magnetizable member, a source of current for said coil, and means for coupling said source of current to said coil to magnetize said member and the releasing means comprising a neutralizing winding energized by said means responsive to energy received from said applied energy waves.

3. In an indicating instrument of the type wherein two separately applied energy waves are used to produce a resultant directive magnetic field, and a movable indicator means is moved to a position indicating the position of said directive magnetic field, the combination of control means for holding said indicator means in fixed position comprising means normally holding said indicator in relatively fixed position in the absence of applied energy, said holding means comprising a magnetizable member, a source of current, a coil operatively associated with said magnetizable member, and means for coupling said source of current to said coil to produce a magnetic field to magnetize said member, and means energized as a function of the reception of said energy waves for releasing said holding means comprising a second coil operatively associated with said magnetizable member, means for deriving a current as a function of the reception of said energy waves, and means for applying said derived current to said second coil to produce a magnetic field opposed to said magnetic field first named, to neutralize the magnetization of said member thereby releasing said indicator means.

4. In a shock-resisting radio apparatus for visually indicating the relative magnitude of two simultaneously-received signals, said apparatus being of the type having means for receiving the signals, means for generating by said received signals a first field of force which has a region of maximum intensity, and means rotatably mounted in and actuated by said first field of force to visually indicate the position of said region, the combination of means energized independently of the reception of said signals for precluding rotation of said rotatably mounted means as a result of shocks, and means responsive to energy received for generating a second field of force for neutralizing the effect of said independently energized means upon said rotatably mounted means so as to permit actuation of the latter by said field of force.

5. A radio apparatus according to claim 4, in which said independently energized means include means for actuating said rotatably mounted means in a plane substantially perpendicular to the plane of rotation thereof.

6. A radio apparatus according to claim 4, in which said rotatably mounted means is mounted for limited rockable movement substantially about its axis of rotation and in a plane substantially perpendicular to its plane of rotation.

7. In an indicating device, a hollow cylindrical member formed of insulating material, a pair of rings of magnetizable material having substantially the same internal diameter as said cylindrical member and positioned in parallel spaced-apart relation therein, a base plate of insulating material for said cylindrical member, a top cover plate of insulating material for said cylindrical member, a rotatable shaft centrally mounted on said bottom plate and extending through said top plate, a bar magnet on said shaft between said base plate and said top cover plate, said bar magnet being mounted transversely of said shaft and having a limited amount of rockable movement longitudinally of said shaft, means for mounting said bar magnet for rotation with said shaft, and means for magnetizing said pair of rings to produce a rocking movement of said bar magnet for holding said magnet against rotation.

8. An indicating device according to claim 7, further comprising frictional means positioned adjacent said bar magnet for contact thereby upon said rocking movement thereof.

9. An indicating device according to claim 7, in which the means for magnetizing said pair of rings includes a coil and a source of current connected thereto.

10. An indicating device according to claim 7, in combination with resilient means mounted on said shaft for returning said bar magnet to its original position upon demagnetization of said pair of rings.

11. In an indicating device, a pair of normally demagnetized ring-shaped members composed of magnetizable material, said ring-shaped members being mounted in spaced-apart parallel relation one above the other, a core of magnetizable material connecting oppositely-disposed points on the respective peripheries of said ring-shaped members and lying substantially perpendicular to the planes of the members, a source of current, a pair of coils wound on said core, said coils being so wound that energization of either coil by current from said source will magnetize said ring-shaped members, while energization of both coils by current from said source will cause the fields of said coils to substantially neutralize one another and permit said pair of ring-shaped members to remain demagnetized, and a bar magnet rotatably mounted centrally of said ring-shaped members for normal rotation in a plane parallel to the planes thereof.

12. In an indicating device, a pair of normally demagnetized ring-shaped members composed of magnetizable material, said ring-shaped members being mounted in spaced-apart parallel relation one above the other, a core of magnetizable material connecting oppositely-disposed points on the respective peripheries of said ring-shaped members and lying substantially perpendicular to the planes of the members, a source of current, a pair of coils wound on said core, said coils being so wound that energization of either coil by current from said source will magnetize said ring-shaped members, while energization of both coils by current from said source will cause the fields of the two coils to substantially neutralize one another and permit said pair of ring-shaped members to remain demagnetized, a bar magnet rotatably mounted centrally of said ring-shaped members, said magnet being normally rotatable in a plane parallel to the planes of said ring-shaped members, and means contacted by said magnet upon magnetization of said ring-shaped members for preventing normal rotation of said magnet.

13. An indicating device according to claim 12, in which said means contacted by said magnet upon magnetization of said ring-shaped members comprises an insulating element having a surface frictionally engaging said magnet.

14. In an indicating device, a pair of normally demagnetized ring-shaped members composed of magnetizable material, said ring-shaped members being mounted in spaced-apart parallel relation one above the other, a core of magnetizable material connecting oppositely-disposed points on the respective peripheries of said ring-shaped members and lying substantially perpendicular to the planes of the members, a source of current, a pair of coils wound on said core, said coils being so wound that energization of either coil by current from said source will magnetize said ring-shaped members, while energization of both coils by current from said source will cause the fields of the two coils to substantially neutralize one another and permit said pair of ring-shaped members to remain demagnetized, a bar magnet rotatably mounted centrally of said ring-shaped members, said magnet being normally rotatable in a plane parallel to the planes of said ring-shaped members, and means energized when said ring-shaped members are demagnetized for establishing around said bar magnet a field of force having a region of maximum intensity, said magnet acting to indicate the location of said region.

DONALD D. GRIEG.

REFERENCES CITED

The following references are of record in the file of this patent:

UNITED STATES PATENTS

| Number | Name | Date |
|---|---|---|
| 2,330,661 | Arey et al. | Sept. 28, 1943 |
| 497,539 | Frolich | May 16, 1893 |
| 2,002,574 | Hart et al. | May 28, 1935 |
| 2,171,561 | Hooven | Sept. 5, 1939 |